UNITED STATES PATENT OFFICE.

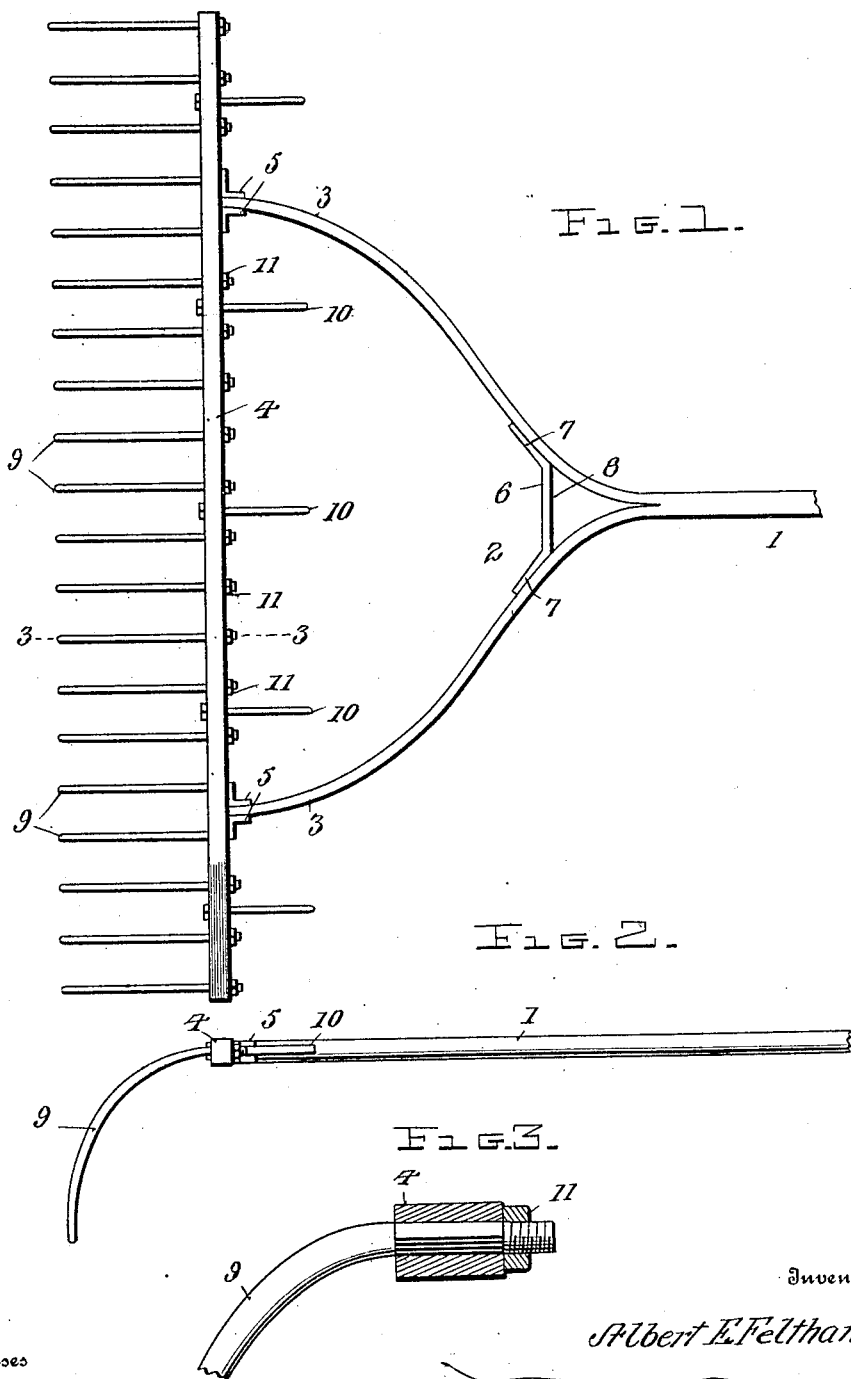

ALBERT E. FELTHAM, OF PROVIDENCE, RHODE ISLAND.

HAY-RAKE.

No. 909,879.  Specification of Letters Patent.  Patented Jan. 19, 1909.

Application filed May 9, 1908. Serial No. 431,842.

*To all whom it may concern:*

Be it known that I, ALBERT E. FELTHAM, a citizen of the United States, residing at Providence, in the county of Providence, State of Rhode Island, have invented certain new and useful Improvements in Hay-Rakes; and I do hereby declare the following to be a full, clear, and exact description of the invention, such as will enable others skilled in the art to which it appertains to make and use the same.

This invention has relation to hand rakes especially constructed for raking hay; and it is the purpose of the invention to provide improvements that will greatly enhance the efficiency and durability of implements of the kind mentioned.

The invention consists of the novel construction and relationship of the parts and combination of parts herein shown, described and claimed.

The drawings hereunto annexed form a part of this specification, and represent the invention in the best form that it is now contemplated to make it, though it is recognized that mechanical changes may be made in the construction and arrangement of parts without departing from the general nature or spirit of the invention.

Of the said drawings, Figure 1 is a plan view of the invention. Fig. 2 is a side elevation. Fig. 3 is an enlarged sectional view taken in the plane 3—3 of Fig. 1.

Similar characters of reference designate similar parts or features in all of the views.

In the drawings, 1 designates the round pole-handle, that may be as long as desired, which handle is bifurcated for a considerable distance at its forward end, and the bifurcated portions 2, are divergently bowed, their extremities 3 being secured to the rake-head 4 by angle irons 5 on each side of the said extremities, one extension of the said angle irons being secured by bolts or screws to the sides of said extremities, while the other extension or portion is secured in like manner to the rear side of the rake-head. The latter consists of a bar of wood rectangular in cross section, and is of usual or desired length and strength.

6 designates a brace which may be composed of steel or other suitable material, having arms 7, curved to fit on the inner sides of the bowed bifurcated parts and secured thereto by screws or other suitable means. The rear ends of the arms of the brace are connected by an integral cross bar 8. This brace serves to strengthen the construction and maintain the bowed portions 2 in place.

9 designates the teeth which are composed of lengths of steel rods, secured at their upper ends in the rake-head 4 by jam-screws or other suitable means, and curved down and forward, as shown so as to gather the hay cleanly from the ground and in maximum amount. The teeth terminate in a common or the same plane, so that the rake operates most efficiently when drawn over the surface of the ground.

The teeth 9 are formed from steel rods having their rear upper ends square and fitting through square apertures in the head 4 and with threaded terminals to receive binding nuts 11 by which they are secured in the head. By this means it will be obvious that the teeth are easily removable so that broken or impaired teeth may be easily renewed without discarding the remainder of the rake.

10 designates pins secured in the rake head and extending in the same plane as the handle and operate effectually to prevent hay gathered by the teeth from rolling or passing over the top of the rake head. These pins are disposed at intervals and are made long enough to accomplish their object.

The improved device is simple in construction, can be inexpensively manufactured, and materially facilitates the operation of the raking action. The stop pins 10 are an important feature of the invention, and add materially to its value and utility as they effectually prevent the hay from riding over the head and likewise enable the rake to gather a greater quantity at each " raking ".

What is claimed, is:—

1. A rake comprising a handle bifurcated at its forward end, a rake-head of wood rectangular in cross section, the bifurcated portions of the handle being divergently spread and bent in the form of bows, the terminals of which are secured to the top of the rake-head by angle-irons as specified, a brace in the crotch having curved arms secured to the inner sides of the brace and connected at their upper ends by an integral cross bar, curved teeth secured at their upper ends in the rake-head and projecting forward at their lower ends, and spaced hay retaining pins connected with the rake-head and extending in alinement with the handle.

2. A rake comprising a head, teeth connected at intervals to said head and curving forwardly and downwardly therefrom, a handle connected to said head, and stop pins spaced apart and extending rearwardly of the head and in alinement with the handle.

3. A rake comprising a head, a plurality of teeth curving outwardly and downwardly and with square portions engaging square apertures in the head and with threaded terminals, clamp nuts engaging said threaded terminals, a handle extending from said head, and a plurality of stop pins spaced apart and extending rearwardly from said head and in alinement with the longitudinal plane of said handle.

In testimony whereof, I affix my signature, in presence of two witnesses.

ALBERT E. FELTHAM.

Witnesses:
C. D. RAMESON,
N. H. TRUMAN.